United States Patent [19]
Russell

[11] Patent Number: 5,178,188
[45] Date of Patent: Jan. 12, 1993

[54] METER BYPASS SWIVEL CONNECTOR
[75] Inventor: Jim L. Russell, Tulsa, Okla.
[73] Assignee: J. L. Russell, Inc., Tulsa, Okla.
[21] Appl. No.: 828,356
[22] Filed: Jan. 30, 1992
[51] Int. Cl.[5] ............................................. F16K 17/12
[52] U.S. Cl. ...................................... 137/606; 73/201
[58] Field of Search ................ 137/599.1, 606, 533.11;
251/152; 73/201

[56] References Cited
U.S. PATENT DOCUMENTS

| 2,192,541 | 3/1940 | Davis | 251/152 X |
| 3,301,051 | 1/1967 | Smith | 73/201 |
| 3,444,724 | 5/1969 | Gilpin | 73/201 X |
| 3,810,716 | 5/1974 | Abrahams et al. | 137/533.11 X |
| 3,946,754 | 3/1976 | Cook | 73/201 X |

Primary Examiner—John C. Fox
Attorney, Agent, or Firm—Head & Johnson

[57] ABSTRACT

A meter bypass swivel connector is molded with a ¼" hole located within its upper body portion. A ball check screen or guard separates its upper body portion from its lower body portion to prevent anything from obstructing the customer's service line. A ball check assembly, including a ball, seat, and base, is snapped or screwed into the lower portion of the meter bypass swivel connector. The ball check is configured to allow an uninterrupted or unobstructed flow of gas through the customer's line with pressure as low as 5" of water column. The lower body portion is surrounded by a flange and a swivel nut rests on a metal backup ring disposed on the flange. A swivel gasket installed in the field "seals" the meter bypass swivel connector to the gas meter when the meter nut is tightened to the meter. A one-way coupler is attached in the hole in the meter bypass swivel connector in such a manner that the possibility of a gas leak would be minimal or impossible. The coupler is designed to allow rapid connection of a supplemental gas source through the coupler and the upper portion of the body into the customer's gas line. The connection on the coupler for the supplemental gas flow includes a tamper-resistant, plastic removable plug. Tampering with the protective cap will result in visible evidence to the gas company of the tampering. In any event, any gas taken from the one-way coupler would be measured gas.

19 Claims, 2 Drawing Sheets

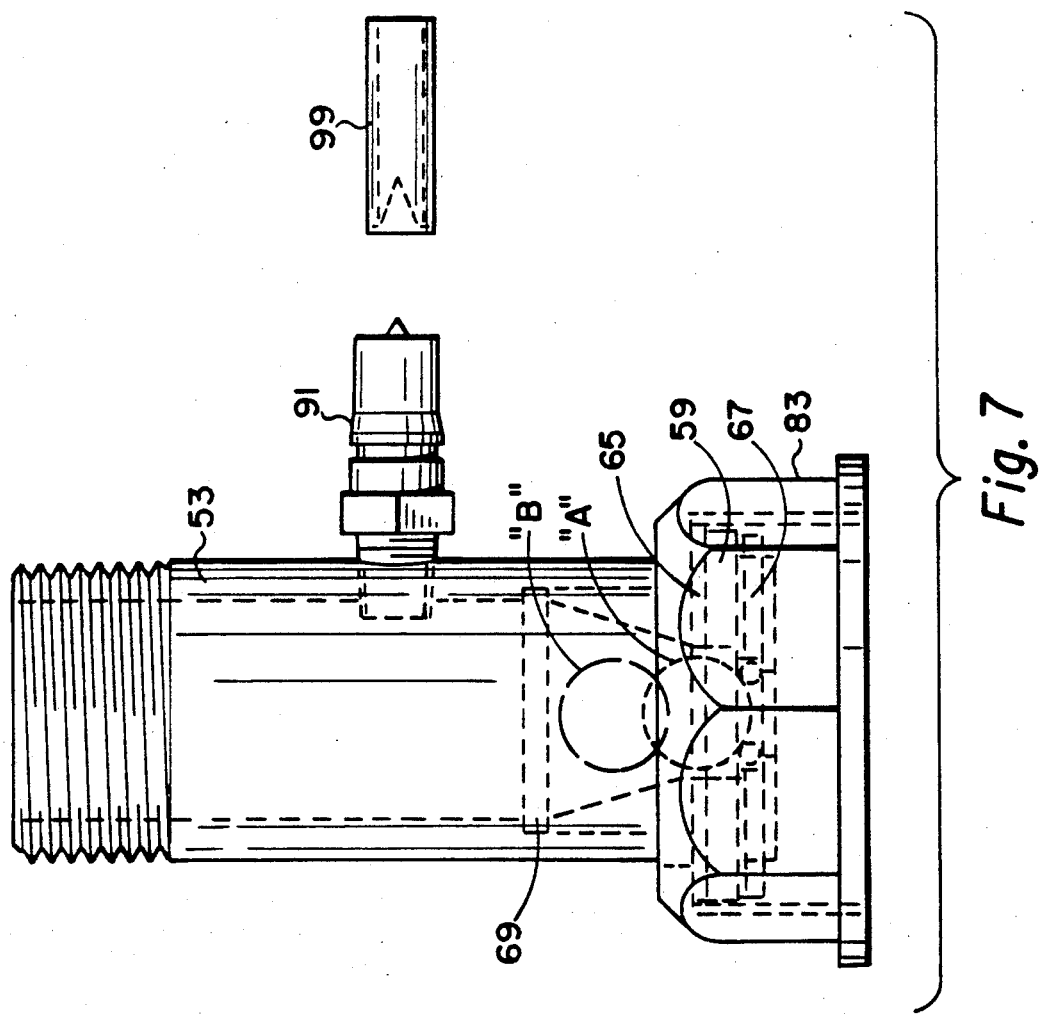
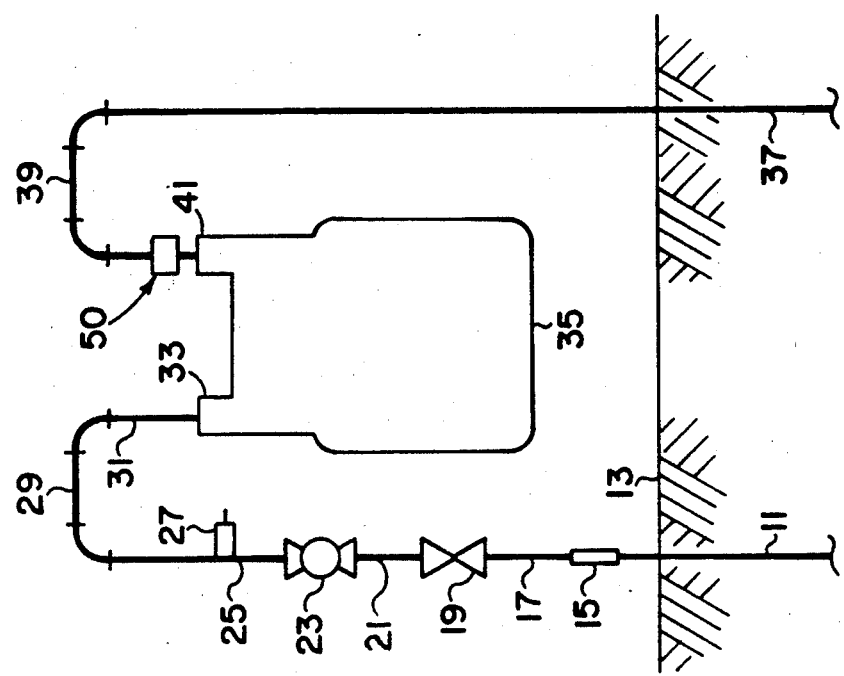

METER BYPASS SWIVEL CONNECTOR

BACKGROUND OF THE INVENTION

This invention relates generally to gas distribution systems and more particularly concerns apparata used to effect meter changes in operational customer gas lines.

Gas companies replace natural gas meters because of unreliability, damage and because changes are required by government regulations. Meter "time" change-outs are dictated by the governing body within the state in which the utility company is operating. This is done to ensure the accuracy of the metering equipment to assure that the customer is receiving the energy for which he is charged. Meter change-outs are normally conducted at 10 to 15 year intervals.

The natural gas distribution industry has a longstanding problem with these meter changes. Gas meter changes generally require disconnection of gas service to the residential or commercial customer. If the gas company does not have access to the customer's premises, the company technician must return to the meter site when access is available so that appliance pilot lights can be lighted, service connections checked, and the customer's equipment evaluated.

The gas company's ideal situation during meter change-outs is to provide the customer with a continuous gas supply so that uninterrupted service to the customer is maintained. This eliminates the need for these additional service calls. There are two methods presently used for maintaining such continuous service.

In one method, the gas company installs fittings for a meter bypass when the original meter piping is installed. A "tee" fitting with a valve and metal plug is installed on the gas company's side of the meter with a shutoff valve just above the tee fitting. On the customer's side of the meter, a second tee fitting with a valve and plug is installed just above the ground and a shutoff valve is installed just above the tee fitting. In performing the change-out, the service technician removes the plug from the company's side of the meter installation and connects a flexible hose with a temporary pressure regulator. The other end of the hose is connected to the customer's tee after the customer's plug is removed. The gas company's shutoff valve is then closed, forcing gas through the "bypass" flexible hose into the customer's service line. The customer's shutoff valve is then closed. The meter change-out is thus made without interruption of natural gas service to the consumer. The problem with this method is that it readily lends itself to gas theft by bypassing the meter unit.

In the other method, a tee with a plug is installed between the top of the meter and the customer's service line. For change-out, complicated by-pass equipment is required. A single piece, neoprene type rubber bag is attached to the tee by a stretch fit to secure the pneumatic integrity of the system. A complex series of steps is required to remove the plug and connect an external gas supply cylinder through the bag to the tee while maintaining pneumatic integrity. This method is expensive, painstaking, time-consuming and befrought with potential for failure in operation and defects in equipment.

It is, therefore, an object of this invention to provide a meter bypass swivel connector which facilitates change-out of a meter without interruption of customer service. It is a further object of this invention to provide a meter bypass swivel connector which does not lend itself to gas theft by bypassing the meter unit.

SUMMARY OF THE INVENTION

In accordance with the invention, a meter bypass swivel connector is provided which eliminates or reduces the time needed to change out a meter, eliminates the need for return visits to reestablish service, reduces to a bare minimum the special tools required for change-out, eliminates replacement of costly insulated swivels, ensures insulation and does not lend itself to gas theft.

The meter bypass swivel connector is preferably, but not necessarily injection molded, nonferrous and electrically insulating. Ultraviolet rays, ambient temperatures, humidity and odorants (injected by gas companies into natural gas systems for purposes of leak detection) will not affect its integrity. It is reusable, lightweight, and paintable. In many cases, it reduces necessary fittings and possibilities of leaks.

The meter bypass swivel connector is constructed with a $\frac{1}{4}''$ or larger hole located within its upper body portion. A ball check screen or guard separates the upper body portion from the lower body portion to prevent anything from obstructing the customer's service line. A ball check assembly, including a ball, seat, and base, is snapped or screwed into the lower portion of the meter bypass swivel connector. The ball check is configured to allow an uninterrupted or unobstructed flow of gas from the meter through the customer's line with pressure as low as 5" of water column. The lower body portion is surrounded by a flange and a swivel nut rests on a metal backup ring disposed on the flange. The metal ring protects the non-ferrous swivel connector from the metal meter nut when the swivel is attached to the gas meter outlet. A swivel gasket installed in the field between the connector flange and the meter outlet "seals" the meter bypass swivel connector to the gas meter when the meter nut is tightened to the meter. A one-way coupler is attached in the hole in the meter bypass swivel connector in such a manner that the possibility of a gas leak would be minimal or impossible. The coupler is designed to allow supplemental gas flow into the customer's gas line.

The fitting on the coupler for connection of the supplemental gas flow source includes a tamper-resistant, plastic removable cap. Tampering with the protective cap will result in visible evidence to the gas company of the tampering. In any event, any gas taken from the one-way coupler would be measured gas.

BRIEF DESCRIPTION OF THE DRAWINGS

Other objects and advantages of the invention will become apparent upon reading the following detailed description and upon reference to the drawings in which:

FIG. 1 is a schematic diagram illustrating a meter installation with the present meter swivel connector attached at the meter outlet;

FIG. 7 is an elevational view of a preferred embodiment of the meter bypass swivel connector illustrating the meter bypass swivel connector in both the "normal" and the "change-out" conditions.

Figure 4:
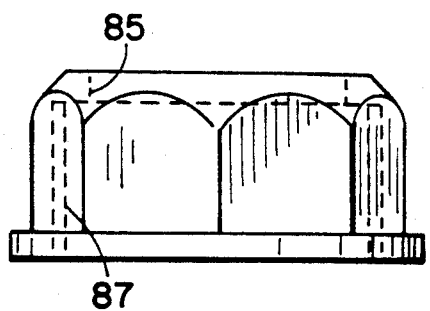
FIG. 4 is an elevational view of the swivel nut of a preferred embodiment of the meter bypass swivel connector.
Figure 2:
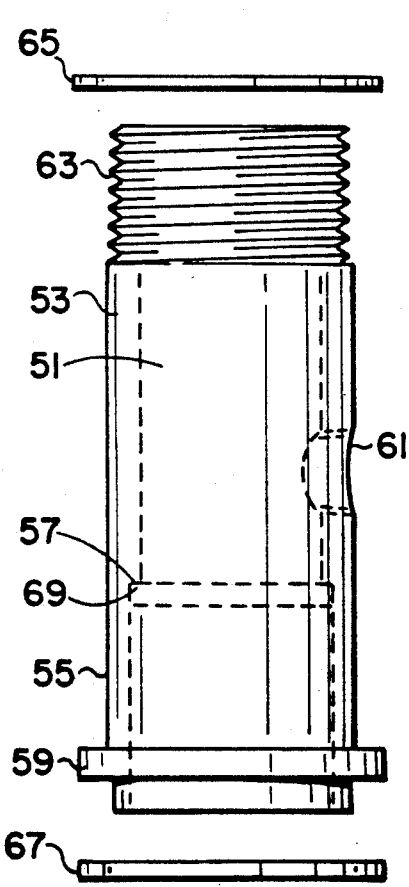
FIG. 2 is an elevational view of the sleeve of a preferred embodiment of the meter bypass swivel connector.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

A typical gas meter installation is illustrated schematically in FIG. 1. The energy company incoming gas line 11 rises above the ground 13 to a transition coupling 15 or similar connection. An inlet riser 17 extends upwardly from the coupling 15 to a point approximately twelve inches above the ground 13. The riser 17 is connected to a stop cock 19 which is in turn connected by a nipple 21 to a service regulator 23. The service regulator 23 is then connected by a nipple 25 to the bend 29 which is approximately twenty-four inches above the ground 13. The bend 29 connects to a swivel 31 which is in turn connected by a swivel nut 33 to the inlet of the meter 35.

At the other side of the meter 35, the customer's riser 37 extends upwardly from the ground 13 to a bend 39 located approximately twenty-four inches above the ground 13. Prior to the present invention, the bend 39 would have been connected to the swivel 41 at the outlet of the meter 35. However, as shown, the meter bypass swivel connector 50 of the present invention is connected between the bend 39 and the swivel nut 41 at the outlet of the meter 35.

The components of the meter bypass swivel connector 50 are illustrated in FIGS. 2 through 6. Beginning with reference to FIG. 2, the main body of the meter bypass swivel connector 50 consists of a sleeve 51 preferably having an upper portion 53 of a first internal diameter and a lower portion 55 of diameter larger than that of the upper portion 53 so as to form an inverted annular seat 57 between the upper portion 53 and the lower portion 55. The lower portion 55 has an external annular flange 59 extending about its surface. The upper portion 53 has a hole 61, perhaps ¼ inch in diameter, through it and external threads 63 on its upper end.

The sleeve 51 could, of course, consist of two separate segments, the upper segment having the hole 61 and the lower segment being the flange 59. For example, the upper segment or extension might consist of a 180° return bend or similar piping with a hole 61 provided in it.

The sleeve 51 will preferably be injected molded of nonferrous material so as to be electrically insulating and unaffected by ultraviolet rays, ambient temperatures, humidity and odorants. It will also preferably be lightweight and paintable. However, various combinations of ferrous and non-ferrous materials might be employed. Preferably, if the flange 59 consists of a nonferrous material, a metal ring 65 is provided which slides over the upper portion 53 of the sleeve 51 and rests o the upper surface of the flange 59. Similarly, a gasket 67 is provided to slide over the lower portion 55 of the sleeve 51 into abutment with the lower surface of the flange 59. Finally, the upper and lower portions 53 and 55 of the sleeve 51 are separated by a screen or guard 69 which is inserted into the sleeve 51 and rests in the inverted seat 57, separating the upper and lower portions 53 and 55 of the sleeve 51.

Figure 3:
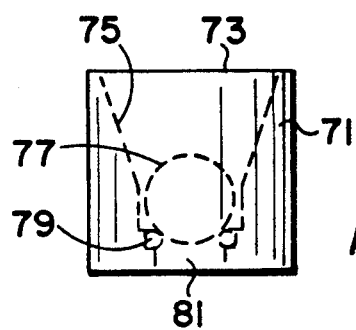
FIG. 3 is an elevational view of the ball check assembly of a preferred embodiment of the meter bypass swivel connector.

Turning to FIG. 3, a ball check valve 71 for insertion into the lower portion 55 of the sleeve 51 is illustrated. The ball check valve 71 is typical of such devices and generally consists of a casing defining a large outlet 73 opening to a tapered passageway 75 in which a ball 77 rests on a seated O-ring above a narrow inlet 81. Preferably, the ball check valve 71 is selected to prevent the flow of gas from the outlet 73 through the inlet 81 and to permit the flow of gas from the inlet 81 through the outlet 73 when the gas pressure exceeds a predetermined value. Preferably, this pressure might be in the range of as little as three inches of water column. The ball check valve 71 may be snapped or screwed into place in the sleeve 51. Of course, any of a variety of check valves might be used in place of the ball check valve 71, provided the flow control above described is accomplished.

FIG. 4 illustrates a swivel nut 83 for connecting the meter bypass swivel connector 50 to the outlet of the meter 35. The nut 83 has an internal flange 85 about its upper portion and internal threads 87 for engagement with the threaded outlet (not shown) on the meter 35.

Figure 5:
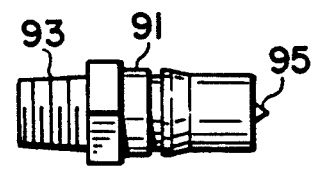
FIG. 5 is an elevational view of the one way coupler of a preferred embodiment of the meter bypass swivel connector.

Turning now to FIG. 5, the meter bypass swivel connector 50 also employs a quick disconnect coupler 91 having one end 93 adapted for snug attachment within the hole 61 of the sleeve 51. Preferably, the connection of the adapted end 93 with the hole 61 will have sufficient pneumatic integrity to prevent any gas leak through this connection. The coupler 91 is a one-way coupler having a bias mechanism 95 in its other end which prevents flow of gas from its insertion end 93 toward its biased end 95 under normal conditions. However, movement of the mechanism 95 against the bias and toward the inserted end 93 of the coupler 91 opens the passageway (not shown) through the coupler 91 to permit gas to flow from the biased end 95 through the inserted end 93. Once again, any of a variety of such couplers could be used, provided they accomplish the flow control above described.

Figure 6:
FIG. 6 is an elevational view of the protective cap of a preferred embodiment of the meter bypass swivel connector.

Turning to FIG. 6, the final component of the meter bypass swivel connector 50, a protective cap 97, is shown. The protective cap 97 is designed to slip over the biased end 95 of the coupler 91 to prevent tampering with the coupler 91 without visible damage to or destruction of the protective cap 97 to facilitate detection of the tampering. Preferably, the cap 97 will be made of plastic, but any suitable material may be employed.

The operation of the swivel bypass connector 50 can best be understood in reference to FIG. 7 which illustrates the connector 50 in its assembled condition.

To accomplish a meter change-out using the swivel bypass connector 50, the service technician first removes the protective cap 97 from the one-way coupler 91. An external source 99 of natural gas is then attached and supplied to the customer's service line at an adequate, pressure-controlled flow by connecting the source 99 to the coupler 91. The shutoff valve 19 located on the company's riser 17 is then closed. The meter nut swivel connections are loosened with the meter nut swivel connection 41 located on the customer's side of the meter 35 completely disconnected first. The pressure loss, coupled with the ball check closing (position A), will force the gas from the external supply 99 through the upper portion 53 of the sleeve 51 into the customer's service line, providing a supplemental supply to the customer's appliances. The ball 77 within the ball check assembly 71 will allow upward flow from the meter 35 until the meter 35 is disconnected, or the gas flow is stopped at the shut off valve. Then the ball 77 seats and closes the outlet meter connection. Once the ball check is closed (position "A"), the meter change-out can be accomplished. After the new meter is connected to the gas company's supply swivel 33, the shutoff valve 19 is reopened. The meter 35 is "purged" and the regulator 23 is checked while venting the natural gas to the atmosphere. The meter 35, after all testing is completed and while still venting gas, is then reattached to the customer's meter bypass swivel 50. The external gas supply 99 is then reduced. The flow of the company's gas will force the ball 77 to raise (position "B") and reestablish the flow of gas into the customer's gas line. The screen 69 prevents the ball 77 from leaving the lower portion 55 of the sleeve 51. The external ga source 99 is then disconnected from the one-way coupler 91. After a complete meter leak inspection, a "new" protective cap 97 will be installed. At this point, the meter change-out has been completed without any service interruption to the customer's premises.

Thus, it is apparent that there has been provided, in accordance with the invention, a meter bypass swivel connector that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For connection in a gas line for use with an auxiliary gas source, a by-pass swivel connector comprising:
   a sleeve;
   a screen disposed within said sleeve and separating said sleeve into said upper and lower portions;
   valve means disposed in said sleeve for permitting flow of gas upwardly through said lower portion of said sleeve and for preventing flow of gas downwardly through said lower portion of said sleeve;
   a hole through said upper portion of said sleeve; and
   a coupling means disposed in said hole for preventing flow of gas from said sleeve through said coupling means and for permitting gas to flow through said coupling means and upwardly through said upper portion of said sleeve when the auxiliary gas source is connected to said coupling means.

2. For connection in a gas line for use with an auxiliary gas source, a by-pass swivel connector comprising:
   a sleeve;
   a screen disposed within said sleeve and separating said sleeve into said upper and lower portions;
   valve means disposed in said sleeve for permitting flow of gas upwardly through said lower portion of said sleeve and for preventing flow of gas downwardly through said lower portion of said sleeve;
   an extension sleeve connected to said upper portion, said extension sleeve having a hole through a wall thereof; and
   a coupling means disposed in said hole for preventing flow of gas from said extension sleeve through said coupling means and for permitting gas to flow through said coupling means and upwardly through said extension sleeve when the auxiliary gas source is connected to said coupling means.

3. For connection in a gas line for use with an auxiliary gas source, a by-pass swivel connector comprising:
   a sleeve having an annular flange about a lower portion thereof and a hole through an upper portion thereof;
   a screen disposed within and separating said upper and lower portions of said sleeve;
   valve means disposed in said sleeve for permitting flow of gas upwardly through said lower portion of said sleeve and for preventing flow of gas downwardly through said lower portion of said sleeve; and
   coupling means disposed in said hole for preventing flow of gas from said sleeve through said coupling means and for permitting gas to flow through said coupling means and upwardly through said upper portion of said sleeve when the auxiliary gas source is connected to said coupling means.

4. A connector according to claim 3, said coupling means being a quick disconnect valve.

5. For connection to an outlet of a gas meter for use with an auxiliary gas source, a by-pass swivel connector comprising:
   a sleeve having an annular flange about a lower portion thereof and a hole through an upper portion thereof;
   a gasket around said sleeve and abutting a lower surface of said flange;
   a screen disposed within and separating said upper and lower portions of said sleeve;
   valve means disposed in said sleeve for permitting flow of gas upwardly through said lower portion of said sleeve and for preventing flow of gas downwardly through said lower portion of said sleeve;
   coupling means disposed in said hole for preventing flow of gas from said sleeve through said coupling means and for permitting gas to flow through said coupling means and upwardly through said upper portion of said sleeve when the auxiliary gas source is connected to said coupling means.

6. A connector according to claim 5, said coupling means being a quick disconnect valve.

7. A connector according to claim 6 further comprising a fastening means seated on an upper surface of said flange for securing a lower surface of said gasket in sealed abutment with the gas meter outlet.

8. A connector according to claim 7, said fastening means comprising a swivel nut rotatably seated around said sleeve and on an upper surface of said flange whereby said lower surface of said gasket is drawn into sealed abutment with the gas meter outlet when said swivel nut is threaded onto the gas meter.

9. A connector according to claim 8 further comprising a metal ring disposed around said sleeve and between said upper surface of said flange and said swivel nut.

10. A connector according to claim 6, said sleeve being nonferrous.

11. A connector according to claim 6, said sleeve having an upper portion of a first internal diameter and a lower portion of a second internal diameter greater than said first diameter defining an inverted internal seat therebetween, said screen being disposed against said inverted internal seat.

12. A connector according to claim 6, said valve means comprising a ball check valve.

13. A connector according to claim 12, said valve means being disposed within said sleeve below said screen.

14. A connector according to claim 6, said quick disconnect valve being a pressure operated one-way valve.

15. A connector according to claim 6 further comprising cap means secured to said coupling means to prevent access to an inlet thereof.

16. A connector according to claim 15, said cap means being non-removable from said coupling means without destruction thereof.

17. A connector according to claim 15, said cap means being non-removable from said coupling means without visible damage thereto.

18. For connection to an outlet of a gas meter for use with an auxiliary gas source, a by-pass swivel connector comprising:
a non-ferrous sleeve having an upper portion of a first internal diameter and a lower portion of second internal diameter greater than said first diameter defining an inverted internal seat therebetween, an annular flange about said lower portion proximate a lower end thereof and a hole through said upper portion;
a metal ring around said sleeve and abutting an upper surface of said flange;
a gasket around said sleeve and abutting a lower surface of said flange;
a swivel nut rotatably seated around said sleeve and on an upper surface of said metal ring having internal threads on a lower portion thereof whereby a lower surface of said gasket is drawn into sealed abutment with the gas meter outlet when said swivel nut is threaded onto the gas meter;
a screen disposed against said inverted internal seat;
a ball check valve disposed in said sleeve below said screen for preventing flow of gas downwardly through said lower portion of said sleeve and for permitting flow of gas upwardly through said lower portion of said sleeve;
a coupler disposed in said hole for preventing flow of gas from said upper portion of said sleeve through said coupler and for permitting gas to flow through said coupler and upwardly through said upper portion of said sleeve when the auxiliary gas source is connected to said coupler.

19. A connector according to claim 18, said coupler being a quick disconnect valve.

* * * * *